United States Patent
Kuo (10) Patent No.: US 9,735,822 B1
(45) Date of Patent: Aug. 15, 2017

(54) LOW SPECIFIC ABSORPTION RATE DUAL-BAND ANTENNA STRUCTURE

(71) Applicant: Amazon Technologies, Inc., Reno, NV (US)

(72) Inventor: Jerry Weiming Kuo, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 326 days.

(21) Appl. No.: 14/488,083

(22) Filed: Sep. 16, 2014

(51) Int. Cl.
  *H01Q 5/00* (2015.01)
  *H04B 1/3827* (2015.01)
  *H04B 1/40* (2015.01)
  *H01Q 9/28* (2006.01)

(52) U.S. Cl.
  CPC ............. *H04B 1/3838* (2013.01); *H04B 1/40* (2013.01)

(58) Field of Classification Search
  CPC .................................. H01Q 7/00; H01Q 9/265
  USPC .......................... 343/741–744, 764, 866–867
  See application file for complete search history.

(56) References Cited

U.S. PATENT DOCUMENTS

| | | | | |
|---|---|---|---|---|
| 1,479,638 A * | 1/1924 | Zworykin | ................. | H04B 1/16 343/748 |
| 3,329,954 A * | 7/1967 | Travers | ..................... | G01S 3/14 342/441 |
| 3,390,394 A * | 6/1968 | Glimvall | ................... | H01Q 7/04 343/742 |
| 3,434,145 A * | 3/1969 | Wells | ...................... | H01Q 9/265 343/726 |
| 3,626,418 A * | 12/1971 | Berryman, Jr. | ........... | H01Q 9/28 343/742 |
| 3,918,062 A * | 11/1975 | Haruki | ...................... | H01Q 7/00 343/702 |
| 4,184,163 A * | 1/1980 | Woodward | ............. | H01Q 21/24 343/742 |
| 4,510,501 A * | 4/1985 | Woodward, Jr. | ...... | H01Q 21/205 343/742 |
| 4,872,018 A * | 10/1989 | Feltz | ........................ | H01Q 7/04 340/572.7 |
| 5,126,749 A * | 6/1992 | Kaltner | .............. | G08B 13/2474 340/572.7 |

(Continued)

OTHER PUBLICATIONS

The ARRL Antenna Book, Published by the American Radio Relay League.*

(Continued)

*Primary Examiner* — Hoang Nguyen
*Assistant Examiner* — Awat Salih
(74) *Attorney, Agent, or Firm* — Pierce Atwood LLP (57) ABSTRACT

Dual-band antenna structures and methods of operating the same of an electronic device are described. One apparatus includes a radio frequency (RF) feed and a dual-band antenna structure coupled to the RF feed at a feeding point and coupled to a ground plane at a grounding point. The structure includes a first loop antenna and a second loop antenna, both coupled to the feeding point and the grounding point. The first loop antenna radiates electromagnetic energy in a first resonant mode in a first frequency band and the second loop antenna radiates electromagnetic energy in a second resonant mode in a second frequency band and radiates electromagnetic energy in a third resonant mode in the first frequency band. Surface currents create a pair of hot spots of magnetic field.

20 Claims, 7 Drawing Sheets

(56) References Cited

U.S. PATENT DOCUMENTS

| | | | | |
|---|---|---|---|---|
| 5,437,057 A * | 7/1995 | Richley | | H04B 5/02 343/867 |
| 5,914,692 A * | 6/1999 | Bowers | | H01Q 7/00 340/572.7 |
| 5,945,958 A * | 8/1999 | Staufer | | H01Q 7/005 343/725 |
| 5,973,650 A * | 10/1999 | Nakanishi | | H01Q 7/00 343/742 |
| 6,304,230 B1 * | 10/2001 | Panther | | H01Q 1/3275 343/742 |
| 6,525,694 B2 * | 2/2003 | Jiang | | H01Q 1/38 343/700 MS |
| 8,164,530 B2 * | 4/2012 | Rhodes | | H01Q 7/00 343/709 |
| 8,164,537 B2 * | 4/2012 | Kinezos | | H01Q 1/243 343/702 |
| 8,599,083 B2 * | 12/2013 | Lindenmeier | | H01Q 7/00 343/741 |
| 2003/0063040 A1 * | 4/2003 | Miyata | | H01Q 1/38 343/895 |
| 2004/0183742 A1 * | 9/2004 | Goff | | B82Y 20/00 343/867 |
| 2005/0134519 A1 * | 6/2005 | Fukano | | G06K 7/10336 343/867 |
| 2005/0259029 A1 * | 11/2005 | O'Sullivan | | H01Q 9/42 343/866 |
| 2006/0097918 A1 * | 5/2006 | Oshiyama | | H01Q 1/243 343/700 MS |
| 2007/0182658 A1 * | 8/2007 | Ozden | | H01Q 1/243 343/866 |
| 2008/0018550 A1 * | 1/2008 | Horii | | H01Q 19/04 343/867 |
| 2009/0073072 A1 * | 3/2009 | Lindenmeier | | H01Q 1/3275 343/810 |
| 2009/0146902 A1 * | 6/2009 | Li | | H01Q 21/061 343/867 |
| 2009/0278748 A1 * | 11/2009 | Sako | | H01Q 5/00 343/702 |
| 2009/0315792 A1 * | 12/2009 | Miyashita | | H01Q 1/243 343/742 |
| 2010/0001914 A1 * | 1/2010 | Lavedas | | H01Q 1/2216 343/742 |
| 2010/0231472 A1 * | 9/2010 | Tran | | H01Q 1/2266 343/742 |
| 2010/0253587 A1 * | 10/2010 | Lindenmeier | | H01Q 7/00 343/797 |
| 2010/0277376 A1 * | 11/2010 | Chakam | | H01Q 1/3241 343/702 |
| 2011/0063180 A1 * | 3/2011 | Su | | H01Q 3/24 343/795 |
| 2011/0102281 A1 * | 5/2011 | Su | | H01Q 1/36 343/742 |
| 2011/0241953 A1 * | 10/2011 | Su | | H01Q 7/00 343/728 |
| 2012/0249396 A1 * | 10/2012 | Parsche | | H01Q 1/243 343/866 |
| 2013/0214979 A1 * | 8/2013 | McMilin | | H01Q 9/42 343/750 |
| 2013/0307740 A1 * | 11/2013 | Pajona | | H01Q 7/00 343/748 |
| 2014/0085161 A1 * | 3/2014 | Zhu | | H01Q 7/00 343/867 |
| 2014/0132465 A1 * | 5/2014 | Sanchez | | H01Q 1/243 343/748 |
| 2015/0048991 A1 * | 2/2015 | Pajona | | H01Q 7/00 343/852 |
| 2016/0099497 A1 * | 4/2016 | Lee | | H01Q 1/38 343/702 |

OTHER PUBLICATIONS

Internal Meandered Loop Antenna for Multiband Mobile Phone with the Users Hand, by Lin et al.*
Quarter-Wavelength Printed Loop Antenna, by Wong et al.*

* cited by examiner

LOW SPECIFIC ABSORPTION RATE DUAL-BAND ANTENNA STRUCTURE

BACKGROUND

People are increasingly utilizing electronic devices, and in particular portable computing devices, for a wide variety of tasks. Many of these devices wirelessly communicate with a communications infrastructure to enable the consumption of digital content. In order to wirelessly communicate with other devices, these electronic devices include one or more antennas. In order to ensure the safety of these devices, regulations have been established regarding the fields generated by wireless communications. For example, in the United States consumer portable devices presently need to meet the FCC's specific absorption rate (SAR) requirement. SAR is a measure of the rate at which energy is absorbed by the body when exposed to a radio frequency (RF) electromagnetic field. While it is necessary to limit the RF field for safety reasons, a minimum amount of gain is needed for proper performance. A user's body can block the RF electromagnetic field in the direction of the user's body, thus further reducing the gain in that direction.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing dual-band antenna functionality in an electronic device. In particular, various embodiments include a radio frequency (RF) feed and a dual-band antenna structure that is coupled to the RF feed at a feeding point and coupled to a ground plane at a grounding point. The dual-band antenna structure includes a first loop antenna coupled to the feeding point and the grounding point and a second loop antenna coupled to the feeding point and the grounding point. The second antenna loop is also connected to a ground plane using a pair of band pass filters, one proximate the feeding point and one proximate the grounding point. The first loop antenna and the second loop antenna may be planar loop antennas that lie in a single plane which may also contain the conductors of the RF feed. Alternatively, the first loop antenna and the second loop antenna can be three-dimensional loop antennas. A loop antenna has a continuous conducting path leading from one conductor (e.g., the RF feed) to another conductor (e.g., the ground plane). When RF signals are applied to the RF feed, the first loop antenna radiates electromagnetic energy in a first resonant mode in a first frequency band and the second loop antenna radiates electromagnetic energy in a second resonant mode in a second frequency band of the dual-band antenna structure and radiates electromagnetic energy in a third resonant mode in the first frequency band. The first frequency band is higher than the second frequency band. Surface currents, generated due to the RF signals applied at the feeding point, create only two hot spots of magnetic field. The hot spots are areas on the dual-band antenna structure at which surface-current density is higher than on an area surrounding the hot spot areas. Hot spots of magnetic field may also be referred to as surface-current hot spots.

In one embodiment, a first hot spot is located near the feeding point and a second hot spot is located near the grounding point. The dual-band antenna structure can be used for Long Term Evolution (LTE) frequency bands, third generation (3G) frequency bands, Wi-Fi® and Bluetooth® frequency bands or other wireless local area network (WLAN) frequency band, wide area network (WAN) frequency bands, global positioning system (GPS) frequency bands, or the like. As mentioned, it can be difficult to sufficiently reduce 5G SAR for dual-band antenna structures. By introducing one or more current-constrained circuits, as discussed herein, the 5G SAR can be reduced with respect to previous dual-band antenna designs, with a reduction of at least an additional 2 dB over previous designs. The current-constrained circuits, or current concentration circuits, can be designed to have a frequency-dependent phenomenon, such that current at higher frequencies is constrained from leaving the area of each of the circuit.

Various other functions and advantages are described and suggested below as may be provided in accordance with the various embodiments.

Figure 1:
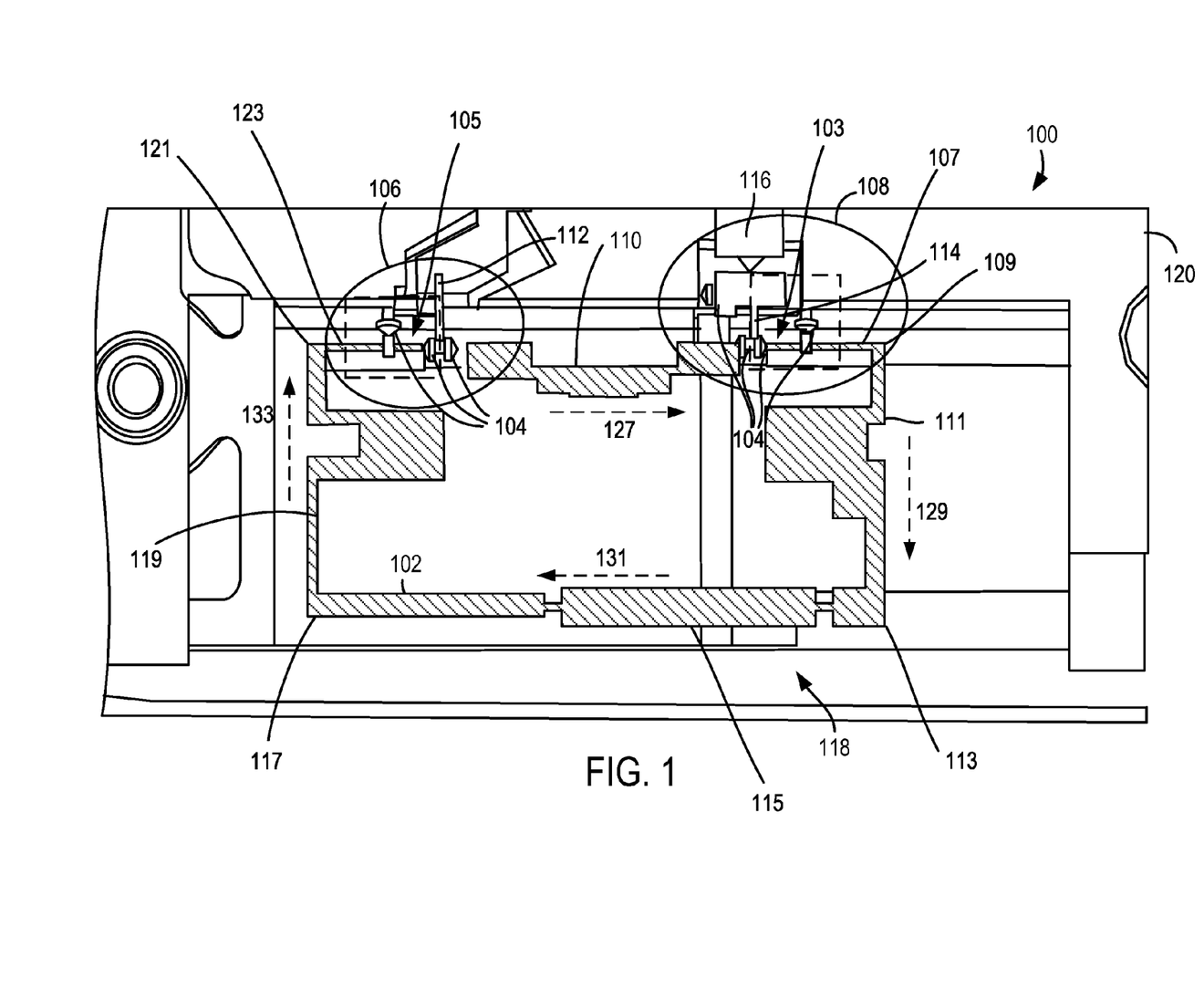
FIG. 1 illustrates a dual-band antenna structure that can be utilized in a computing device in accordance with various embodiments.

FIG. 1 illustrates a view 100 of a dual-band antenna structure 118 of a user device that can be utilized in accordance with at least one embodiment. The dual-band antenna structure 100 includes two loop antennas. The first loop antenna is an inner loop element 110 and the second loop antenna is an outer loop element 102. The outer loop element 102 and inner loop element 110 are coupled to a RF feed 116 at a feeding point 114 and are coupled to a ground plane 120 at a grounding point 112. The ground plane 120 may be a metal frame of the user device, such as a system ground or one of multiple grounds of the user device. The RF feed 116 carries RF signals to and/or from the dual-band antenna structure 118 and the radio circuitry of the user device. The RF feed 116 may be a feed line connector that couples the dual-band antenna structure 118 to a respective transmission line of the user device. The RF feed 116 is a physical connection that carries the RF signals to and/or from the dual-band antenna structure 118 and the circuitry of the user device. The feed line connector may be any one of the three common types of feed lines, including but not limited to: coaxial feed lines, twin-lead lines, or waveguides. A waveguide, in particular, is a hollow metallic conductor with a circular or square cross-section in which the RF signal travels along the inside of the hollow metallic conductor. Alternatively, other types of connectors can be used.

The user device can include an impedance matching network including multiple impedance-matching components 104. The impedance-matching components 104 can comprise capacitors, inductors, and/or conductive traces having respective capacitances or inductances. The impedance-matching components 104 may be coupled (in series or otherwise) between the RF feed 116, the feeding point 114, the grounding point 112, the ground plane 120, the outer loop element 102, and the inner loop element 110.

The outer loop element 102 is coupled to the RF feed 116 at the feeding point 114 at a near end 103 of the outer loop element 102 and coupled to the ground plane 120 at the grounding point 112 at a distal end 105 of the outer loop element 102, the distal end 105 being the farthest end from the RF feed 116. The outer loop is also coupled to the ground plane 120 by at least one other impedance matching element 104. The inner loop element 102 is coupled to the RF feed 116 at the feeding point 114 at a near end 103 of the inner loop element 110 and coupled to the ground plane 120 at the grounding point 112 at a distal end 105 of the inner loop element 110, the distal end 105 being the farthest end from the RF feed 116. It should be noted that the distal ends and are not the farthest remote point on the respective loop element, but they represent the farthest point away from the RF feed 114 when traversing around the respective loop element from the feeding point 116 to the grounding point 112. There are at least two distances which define the "notion of size" in a loop antenna. These are: the total length of loop element between the feeding point 114 and the grounding point 112 (traversing along the element from the feeding point 114 to the grounding point 112), as well as the largest distance from one point on the loop element to another, measured in a straight line (e.g., one corner of a rectangle shape of a coplanar loop antenna structure to a diagonally opposite corner of the rectangle shape of the coplanar loop antenna structure as illustrated in FIG. 1). Another distance of a loop antenna is the distance from the feeding point 114 to the most remote point on the loop element. All of these distances can be expressed in terms of units of wavelength at the carrier frequency handled by the antenna structure.

The inner loop element 110 is disposed at least partially within an inner area defined by the outer loop element 102. As illustrated in FIG. 1, the outer loop element 102 and the inner loop element 110 form a substantially rectangular shape in which the inner loop element 110 forms a portion of one side of the rectangle between the feeding point 114 and the grounding point 112, whereas the outer loop element 102 forms the rest of that side and the other three sides of the rectangle. As illustrated, the inner loop element 110 has a slight bend between the feeding point 114 and the grounding point 112 such that a center point of the inner loop element 110 is farther away from a linear axis between the feeding point 114 and the grounding point 112. The feeding point 114 and the grounding point 112 are a specified distance apart, such as at least 5 mm apart. Alternatively, other distances between the feeding point 114 and the grounding point 112 may be used in accordance with various embodiments.

In the depicted embodiment, the outer loop element 102 has a U shape with two ends and two junctions. The outer loop element 102 includes a first arm portion 107 that extends from the feeding point 114 to a first junction 109 in a first direction 127, a second arm portion 111 that extends from the first junction 109 in a second direction 129 towards a second junction 113, a third arm portion 115 that extends from the second junction 113 in a third direction 131 towards a third junction 117, a fourth arm portion 119 that extends from the third junction 117 in a fourth direction 133 towards a fourth junction 121, and a fifth arm portion 123 that extends from the fourth junction 121 in the first direction 127 towards the grounding point 112. The first arm portion 107, the third arm portion 115 and the fifth arm portion 123 are parallel to the ground plane 120. The second arm portion 111 and the fourth arm portion 119 are perpendicular to the ground plane 120. It should be noted that a "junction" or "fold" refers to a bend, corner, or other change in direction of an antenna element. For example, the junction may be where one segment of an antenna element changes direction in the same plane or in a different plane. Typically, junctions or folds in antennas can be used to fit the entire length of the antenna within a smaller area or smaller volume of a user device. The dual-band antenna structure 118 can be formed by using one or more conductive traces on a printed circuit board, metal traces disposed on the antenna carrier, or the like.

In one embodiment, a dual-band antenna structure 118 is disposed on an antenna carrier (not illustrated), such as a dielectric carrier of the user device. The antenna carrier may be any non-conductive material, such as dielectric material, upon which the conductive material of the dual-band antenna structure 118 can be disposed without making electrical contact with other metal of the user device. In another embodiment, the dual-band antenna structure 118 is disposed on, within, or in connection with a circuit board, such as a printed circuit board (PCB). In one embodiment, the ground plane 120 may be a metal chassis of a circuit board. Alternatively, the dual-band antenna structure 118 may be disposed on other components of the user device or within the user device (or of or within other electronic devices). It should be noted that the dual-band antenna structure 118 illustrated in FIG. 1 is a two-dimensional (2D) structure. However, as described herein, dual-band antenna structures may include three-dimensional (3D) structures, as well as other variations than those depicted in FIG. 1. The dual-band antenna structure 118 is designed to fit in a smaller volume or area (e.g., 10 mm×26 mm) while maintaining the overall length of the antenna elements. The embodiments of the dual-band antenna structure 118 can be used in compact devices with space constraints. For example, in one embodiment, the dual-band antenna structure 118 fits within an area of 10 mm height and 26 mm width in a cut out of the ground plane 120. This area can still accommodate additional components of the user device. In other embodiments, smaller or larger areas or volumes can be used as appropriate.

The dimensions of the dual-band antenna structure 118 may be varied to achieve the desired frequency range as would be appreciated by one of ordinary skill in the art having the benefit of this disclosure. The total length of the antennas is, however, a major factor for determining the frequency, and the width of the antennas is a factor for impedance matching. It should be noted that the factors of total length and width are dependent on one another in at least some embodiments. The dual-band antenna structure 118 may have various dimensions based on the various design factors. The outer loop element 102 has an effective length that is roughly the distance between the feeding point 114 along the conductive trace(s) to the grounding point 112. In the depicted embodiment, an antenna area of the outer loop element 102 is approximately 7.5 millimeters (mm) in height and 17 mm in width. An antenna area of the inner loop element 110 is approximately 1.5 millimeters (mm) in height and 8 mm in width. It should be appreciated that other variations of layout and/or shape can be used for the dual-band antenna structure 118. For example, the dual-band antenna structure 118 can have various bends, such as to accommodate placement of other components, such as speakers, microphones, or USB ports. The dual-band antenna structure 118 may also include one or more extension sections and tuning section as discussed elsewhere herein.

During operation the RF feed 116 applies current to the outer loop element 102 and the inner loop element 110. The outer loop element 102 and inner loop element 110 will, in turn, radiate magnetic field. As illustrated in FIG. 1, the outer loop element 102 and inner loop element 110 create two hot spots 106, 108 of magnetic field in a first high band (e.g., 5.5 GHz) of the dual-band. The hot spots 106, 108 correspond to areas of the outer loop element 102 and the inner loop element 110 that have higher surface-current densities than other surrounding areas of the outer loop element 102 and the inner loop element 110. That is, surface currents create two hot spots 106, 108 of magnetic field, the hot spots representing areas on the dual-band antenna structure at which surface-current density is higher than on an area surrounding the hot spot areas. In the depicted embodiment, there is a first hot spot 108 near the feeding point 114 and a second hot spot 106 near the grounding point 112. It should be noted that are also hot spots created in a second low band (e.g., 2.44 GHz) of the dual-band. These two hot spots are located proximate the feeding point 108 and the grounding point 112, similar to the hot spots in the first high band discussed previously.

In one embodiment, the inner loop element 110 radiates electromagnetic energy in a first quarter-wave ($\lambda/4$) resonant mode in a high band (first band) of the dual-band antenna structure 118 when the RF signals are applied to the RF feed 116. The factor $\lambda$, represents a length of one electromagnetic wave of a frequency at which an antenna radiates electromagnetic energy, such that $\lambda/4$ is a quarter wavelength. References to operating in one or more resonant modes indicates that the characteristics of an antenna structure, such as length, position, width, proximity to other elements, ground, or the like, decrease a reflection coefficient at a frequency range, such as at the first high band (e.g., 5.5 GHz). The outer loop element 102 radiates electromagnetic energy in a second quarter-wave ($\lambda/4$) resonant mode in a low band (second band) of the dual-band antenna structure 118 and radiates electromagnetic energy in a three-quarter-wave resonant mode in the high band (first band) of the dual-band antenna structure 118 when the RF signals applied to the RF feed 114. In one embodiment, a first quarter-wave resonant mode is centered at approximately 2.44 GHz, a second quarter-wave resonant mode is centered at approximately 5.1 GHz, and a third three-quarters-wave resonant mode is centered at approximately 5.6 GHz. In another embodiment, the first loop antenna and the second loop are quarter-wave antennas, with the first frequency band corresponding to approximately 2.3 GHz to approximately 2.6 GHz and the second frequency band corresponding to approximately 4.9 GHz to approximately 5.9 GHz. In some scenarios, the outer loop element 102 operates in working principle as a folded monopole structure. The embodiments described herein are not limited to use in these frequency ranges, but could be used in one or more frequency bands or frequency ranges, as described herein.

The dual-band antenna structure 118 can be configured to operate in multiple resonant modes. For example, the dual-band antenna structure may include one or more additional arm elements, slot antennas in the dual-band antenna structure or notches to create one or more additional resonant modes. In another embodiment, the dual-band antenna structure may include additional elements, such as a parasitic ground element (e.g., a monopole element that extends from the ground plane that closely couples to the other antenna elements) to create an additional resonant mode. For example, the dual-band antenna structure 118 can be used in wireless local area network (WLAN) frequency bands. Alternatively, the dual-band antenna structure 100 can be used in one or more of the following frequency bands: Long Term Evolution (LTE) 700 (band 17), 1800 (band3) 2600 (band 7) etc., Universal Mobile Telecommunications System (UMTS) (also referred to as Wideband Code Division Multiple Access (WCDMA)) and Global System for Mobile Communications (GSM) 850, GSM 900, GSM 1800 (also referred to as Digital Cellular Service (DCS) 1800) and GSM 1900 (also referred to as Personal Communication Service (PCS) 1900). The dual-band antenna structure 118 may be configured to operate in multiple resonant modes. References to operating in one or more resonant modes indicates that the characteristics of the dual-band antenna structure, such as length, position, width, proximity to other elements, ground, or the like, decrease a reflection coefficient at certain frequencies to create the one or more resonant modes as would be appreciated by one of ordinary skill in the art. Also, some of these characteristics can be modified to tune the frequency response at those resonant modes, such as to extend the bandwidth, decrease the reflection coefficient, or the like. The embodiments described herein also provide a dual-band antenna structure in a size that is conducive to being used in a compact user device.

In the depicted embodiment, the impedance-matching components 104 include a first component coupled in series between the feeding point 114 and the first arm portion 107, a second component coupled in series between the fifth arm portion 123 and the grounding point 112, a third component coupled in series between the feeding point 114 and a first end of the inner loop element 110, a fourth component coupled in series between the grounding point 112 and a second end of the inner loop element 110, and a fifth component coupled between the feeding point 114 and the ground plane 120. A sixth component is coupled between the ground plane 120 and the first arm portion 123 and a seventh component is coupled between the fifth arm portion 123 and the ground plane 120 as well. These components can be discrete components, distributed components, as well as conductive traces with capacitive or inductive properties.

In another embodiment, the dual-band antenna structure 118 includes a first loop antenna coupled to the feeding point and the grounding point and a second loop antenna coupled to the feeding point and the grounding point. When RF signals are applied to the RF feed, the first loop antenna radiates electromagnetic energy in a first resonant mode in a first frequency band. The second loop antenna radiates electromagnetic energy in a second resonant mode in a second frequency band of the dual-band antenna structure and radiates electromagnetic energy in a third resonant mode in the first frequency band. The first frequency band is higher than the second frequency band. When the RF signals are applied to the RF feed, the dual-band antenna structure creates two hot spots of magnetic field, the hot spots being areas on the dual-band antenna structure at which surface-current density is higher than on an area surrounding the hot spot areas. A first hot spot is located near the feeding point. A second hot spot of the three or more hot spots is located near the grounding point.

In one embodiment, the first loop antenna and the second loop are quarter-wave antennas, with the first frequency band being approximately 2.3 GHz to approximately 2.6 GHz and the second frequency band approximately 4.9 GHz to approximately 5.9 GHz. In another embodiment, the first resonant mode is centered at approximately 5.1 GHz, the second resonant mode is centered at approximately 2.44 GHz, and the third resonant mode is centered at approximately 5.6 GHz.

Figure 2:
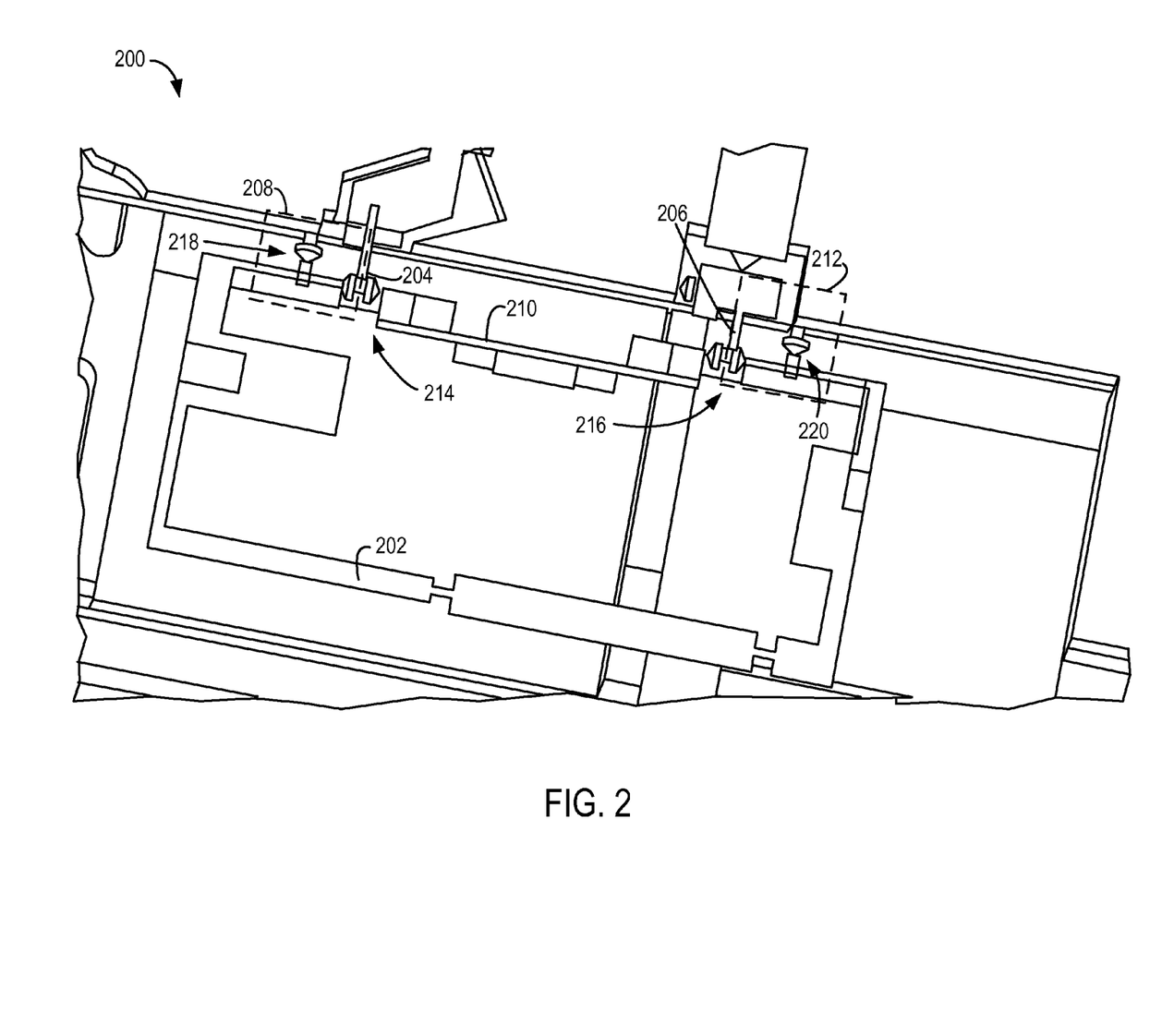
FIG. 2 illustrates a view of two circuits formed in the dual-band antenna structure that are capable of generating hot spots in accordance with various embodiments.

FIG. 2 illustrates an overview 200 of the current-constrained circuits formed by the antenna structure, which generate the hot spots of magnetic field caused by the dual-band antenna structure according to one embodiment. The current-constrained circuits 208, 212 are symmetric in this example, and each is associated with one of the two hot spots discussed with respect to FIG. 1. The first hot spot is located near the feeding point, proximate the first circuit 212 and the second hot spot is located near the grounding point, proximate the second circuit 208. The hot spot contours of magnetic field of FIG. 2 are when the dual-band antenna structure is driven at 5.5 GHz. The hot spots are in similar locations throughout the desired frequency ranges of 2.4 GHz to 2.5 GHz and 5.2 GHz to 5.8 GHz, as described herein. The first circuit 212 includes a 2.4G band pass filter (BPF) 216 and a 5G BPF 220. The second circuit 208 also includes a 2.4G BPF 214 and a 5G BPF 218 in this example. Each 2.4G BPF prevents the 5G current from going to the respective outer arm of the antenna structure while allowing the 2.4 GHz current flow. Each 5G BPF 218, 220 serves as a current sink to further pull the current, causing some of the current to pass through the circuit then back into the ground plane. Each band-pass filter can include a resistor and capacitor, or inductor and capacitor, in series, for example, such as a 0.55 pF capacitor with a 7.5 nF inductor resistor for a 2.4G BPF and a 0.1 pF capacitor with a 10 nF inductor for a 5G BPF in one embodiment. It should be understood, however, that other such filters, such as off-the-shelf filters, can be used as well within the scope of the various embodiments.

As illustrated in FIG. 2, the dual-band antenna structure effectively has two launch points. One launch point is at the feeding point 206 of the RF feed and the other launch point is at the grounding point 204 where the outer loop element 202 and inner loop element 210 are coupled to the ground plane. The two launch points result in the two hot spots. The use of the two loop antenna structure (e.g., outer loop element 202 and inner loop element 210) and corresponding impedance-matching components disperse portions of the surface currents, reducing the overall SAR value within any given 1 g tissue area (e.g., ten by ten by ten millimeter (10×10×10 mm) volume within the antenna area. The hot spots have higher surface-current density than surrounding areas. The surface-current density decreases as a function of distance away from a center area of the respective hot spot. The hot spots are spread out enough that the overall radiation in any given cubic volume near the antenna structure is reduced for SAR testing.

Figure 3:
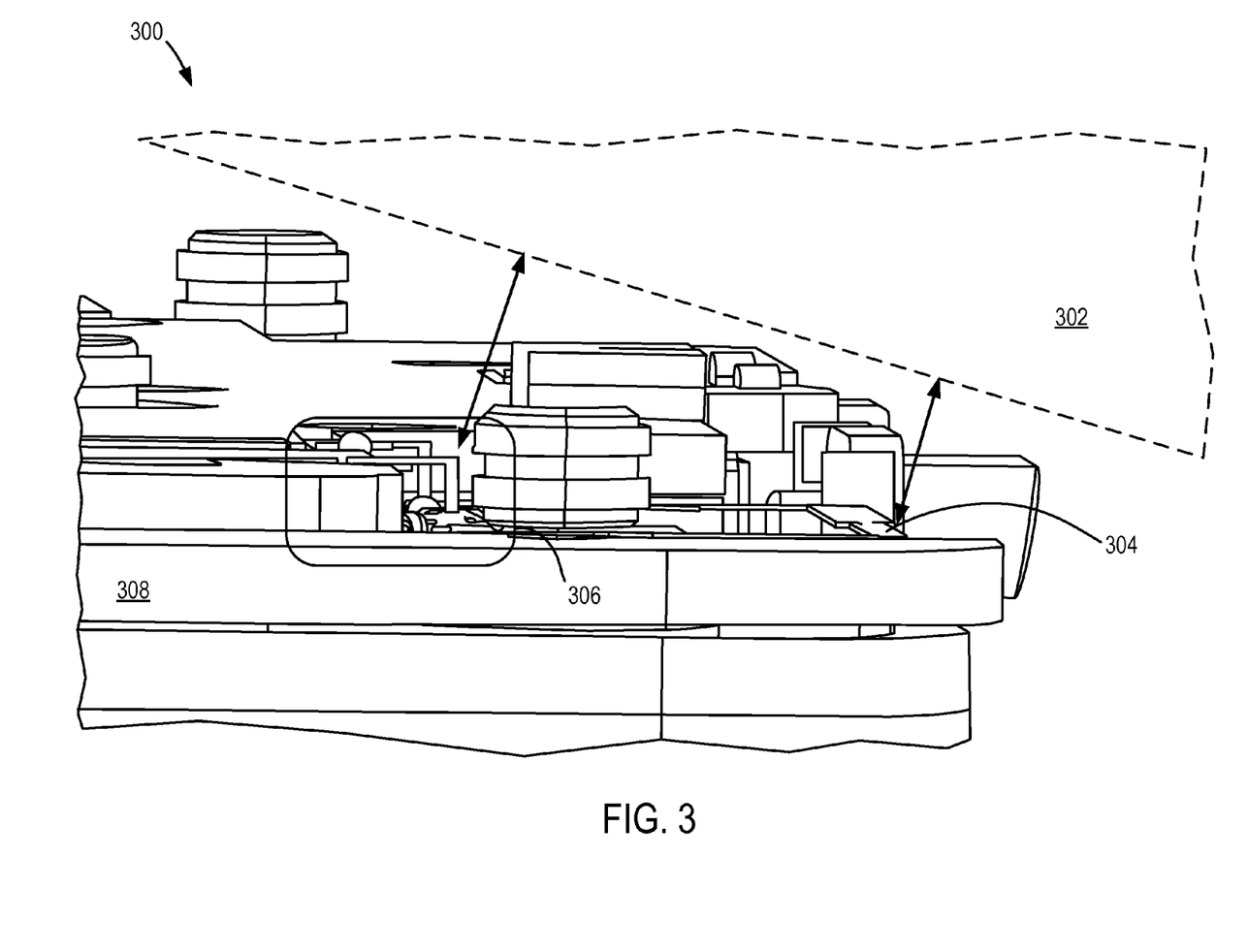
FIG. 3 illustrates a side view of a dual-band antenna structure indicating the differences in distance to a phantom block in accordance with various embodiments.

The embodiments described herein are low SAR antennas that reduce an antenna's SAR values. The dual-band antenna structure, including the two loop elements, can be used to meet the SAR requirement described above where SAR is tested at 0 mm distance between the user device and a phantom block 302, as illustrated in the example situation 300 of FIG. 3. The phantom block is used to simulate the presence of human tissue, such as may be present in the hand of a user utilizing the device. Various phantom blocks for simulating human tissue are known in the art and as such will not be discussed in detail herein. Since a hot spot is a relatively dense region of current, and the current can be detected by the phantom block, it can be desirable to move the host spots away from the phantom block to the extent possible, in order to increase the distance and thereby reduce the strength of the field detectable by the phantom block. The phantom block 302 is considered at a slant position, as the antenna will often be near a corner of the device in at least some embodiments, such that the tissue of a user's skin may be closer to some points at a rounded or slanted edge. In FIG. 3 it can be seen that the distance from one of the circuits 306 near the grounding point is greater than the distance from the outer edge 304 of the antenna structure. By causing the hot spots to be a greater distance (e.g., about 4.5 mm) from the phantom block than if the hot spots were near the outer edge 304 (e.g., about 3.5 mm) of the antenna structure, the SAR value can be further reduced. This reduced SAR value can allow the dual-band antenna structure to operate a higher transmit power, resulting in better communication coverage. The higher transmit power and better communication coverage can result in a better user experience with respect to the user device.

Low SAR antennas, such as the dual-band antenna structures discussed herein, are attractive options for devices such as tablets and wearable electronics. By reducing SAR values in the dual-bands of 2.44 GHz and 5.5 GHz, higher transmission power can be used, particularly in the 5.5 GHz band. The higher transmission power increases throughput in the target frequency band. For example, dual-band WLAN frequency bands, such as dual-band Wi-Fi® bands, need to cover 2.4 GHz to 2.5 GHz and 5.2 GHz to 5.8 GHz. The embodiments described herein can be used to communicate in the dual-band WLAN frequency bands, such as the dual-band Wi-Fi® bands. The high band (e.g., 5.2-5.8 GHz) is a wider bandwidth that usually needs to be covered by multiple resonant modes. A dual-band antenna structure can be used to provide multiple resonant modes in the high band, as well as a resonant mode in the low-band (e.g., 2.4-2.5 GHz). In particular, the inner loop element radiates for the high band with lower SAR properties and the outer loop element radiates the low band with lower SAR properties. The outer loop element also radiates with another resonant mode in the high band, increasing the bandwidth in the high band.

In one embodiment, an electronic device includes a transceiver to transmit or receive RF signals, a RF feed coupled to the transceiver, and a dual-band antenna structure coupled to the RF feed. The dual-band antenna structure includes a ground plane and an outer loop element coupled to the RF feed at a feeding point at near end of the outer loop element and coupled to the ground plane at a grounding point at a distal end of the outer loop element, the distal end being the farthest end from the RF feed. Surface currents create two hot spots as described herein.

The electronic device (also referred to herein as user device) may be any content processing device that includes a transceiver for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, wearable computers (e.g., smart watches and glasses), and the like. The user device may connect to a network to obtain content from a server computing system (e.g., an item providing system) or to perform other activities. The user device may connect to one or more different types of cellular networks.

SAR is dependent on the average power transmitted. Power throttling can be used to back off the average power transmitted to ensure that the device complies with FCC regulations concerning radiation absorbed by human tissue, also referred to as SAR requirements. A procedure known as SAR testing quantifies this absorbed radiation. A SAR number is obtained while testing the device in close proximity to a phantom block 302 (e.g., gel) that simulates the RF properties of human tissue while it is transmitting at full power. To comply with FCC regulations, some devices use proximity sensors to sense a proximity to tissue and reduce the power accordingly. The embodiments described herein utilize the dual-band antenna structure design to reduce SAR when the user device is in proximity to a person (e.g., a human body part) or a SAR phantom block (hereinafter "phantom") as used during testing of SAR for the user device to comply with FCC regulation. For example, the embodiments described herein can minimize SAR by dispersing portions of the surface currents to create two hot spots of magnetic field that are away from the outer edge of the antenna structure to reduce the amount of radiation within any cubic volume of the antenna structure. The hot spots are areas on the dual-band antenna structure at which surface-current density is higher than on an area surrounding the hot spot areas.

Figure 4:
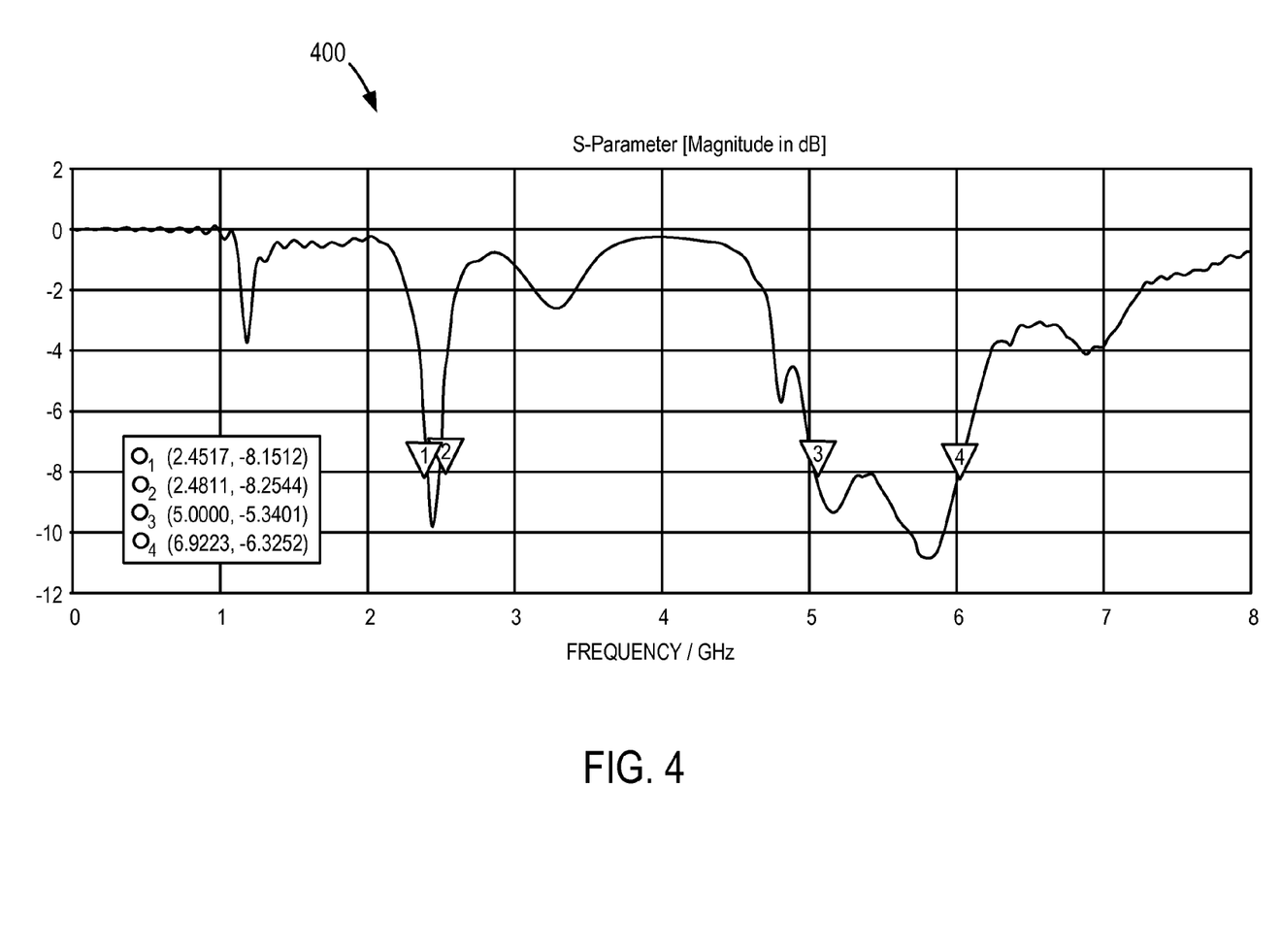
FIG. 4 illustrates a plot of S-Parameter performance for a dual-band antenna structure in accordance with various embodiments.

FIG. 4 illustrates a plot 400 of return loss of an example dual-band antenna structure according to one embodiment. The plot 400 shows the return loss (which can also be represented as the S-parameter (free space) or measured reflection coefficient or |S11|) of a dual-band antenna structure as discussed herein. The free space parameter is a measure of the amount of power going to the antenna and being reflected back. The deeper the power on the curve, the less power is being reflected back from the antenna. The power is going to the antenna then going to space. As illustrated, designs discussed herein provide for a reasonable free space return loss. The plot 400 of FIG. 4 illustrates that the dual-band antenna structure can be caused to radiate electromagnetic energy between approximately 2.3 GHz to approximately 2.6 GHz and between 5.0 GHz to approximately 5.9 GHz, providing reasonable performance with respect to loss over both 2G and 5G, which is useful for communications such as Wi-Fi communications. In a low band (LB), the dual-band antenna structure can operate between approximately 2.3 GHz and approximately 2.6 GHz. In a high band (HB), the dual-band antenna structure can operate between approximately 4.9 GHz to approximately 5.9 GHz. The dual-band antenna structure provides at least three resonant modes, including one in the low band at approximately 2.44 GHz and two in the high band at approximately 5.1 GHz and at approximately 5.6 GHz. In particular, the three resonant modes include a first quarter-wave ($\lambda/4$) resonant mode in the HB from the inner loop element, a second first quarter-wave (214) resonant mode in the LB from the outer loop element, as well as a third three-quarters-wave resonant mode in the high band from the outer loop element. The third three-quarters-wave resonant mode is a harmonic frequency resulting from the first quarter-wave resonant mode. As described herein, other resonant modes may be achieved and the resonant modes may cover different frequency ranges and may be centered at different frequencies than those described and illustrated herein.

In other embodiments, more or less than three resonant modes may be achieved as would be appreciated by one of ordinary skill in the art having the benefit of this disclosure. It should also be noted that the first, second, and third notations on the resonant modes are not be strictly interpreted to being assigned to a particular frequency, frequency range, or element(s) of the antenna structure. Rather, notations such as the first, second, third, fourth and fifth notations are used for ease of description. However, in some instances, the notations are used to designate the order from lowest to highest frequencies. Alternatively, other orders may be achieved as would be appreciated by one of ordinary skill in the art having the benefit of this disclosure. In one embodiment, the dual-band antenna structure can be configured for the LTE 700 (band 17), 1800 (band 3), 2600 (band 7), etc., UMTS, GSM (850, 800, 1800 and 1900), GPS and Wi-Fi® and Bluetooth® frequency bands. In another embodiment, the dual-band antenna structure can be designed to operate in the following target bands: 1) Verizon LTE band: 746 to 787 MHz; 2) US GSM 850: 824 to 894 MHz; 3) GSM900: 880 to 960 MHz; 4) GSM 1800/DCS: 1.71 to 1.88 GHz; 5) US1900/PCS (band 2): 1.85 to 1.99 GHz; and 6) WCDMA band I (band 1): 1.92 to 2.17 GHz. Alternatively, the dual-band antenna structure can be designed to operate in different combinations of frequency bands as would be appreciated by one of ordinary skill in the art having the benefit of this disclosure. Alternatively, the dual-band antenna structure can be configured to be tuned to other frequency bands as would be appreciated by one of ordinary skill in the art having the benefit of this disclosure.

The dual-band antenna structure 100 can be tuned to be centered at various frequencies, such as, for examples, at approximately 2.44 GHz for a first frequency range at approximately at 5.5 GHz for a second frequency range of the dual band. The first and second frequency ranges can be tuned to be centered at other frequencies.

Figure 5:
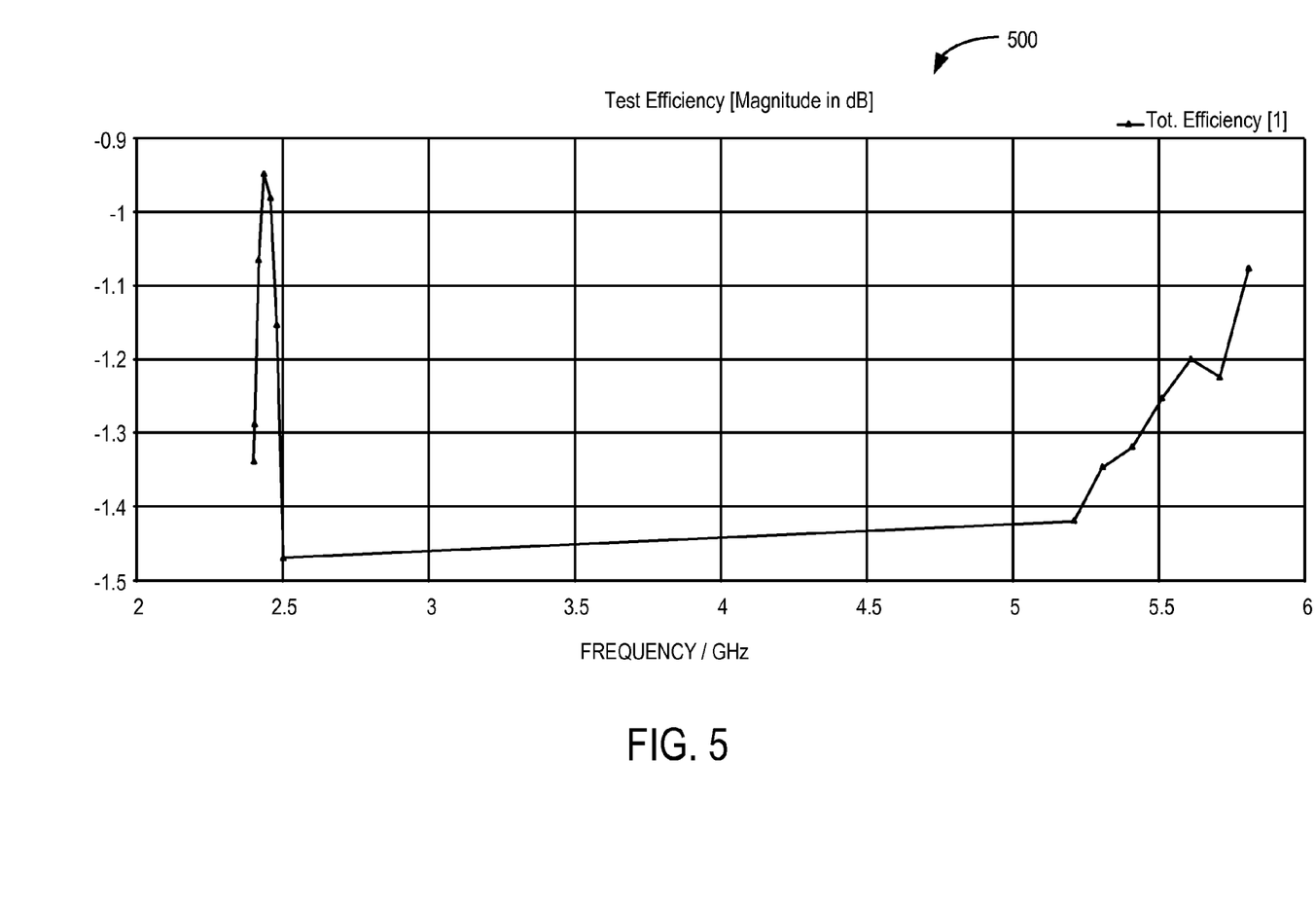
FIG. 5 illustrates a plot of total efficiency of a dual-band antenna structure over a range of frequencies in accordance with various embodiments.

FIG. 5 illustrates a plot 500 of a measured efficiency of the dual-band antenna structure according to one embodiment. The plot 500 illustrates the total efficiency over a frequency range in the low band and over a frequency range in the high band, representing the amount of power that is translated from electrical energy to radiation energy. The plot 500 illustrates that the dual-band antenna structure 100 is a viable antenna for a frequency range between approximately 2.5 GHz to approximately 5.5 GHz. In another embodiment, the dual-band antenna structure can be configured to operate over the low band and the high band and another antenna can be configured to operate in other frequency ranges.

As would be appreciated by one of ordinary skill in the art having the benefit of this disclosure the total efficiency of the antenna can be measured by including the loss of the structure (e.g., due to mismatch loss), dielectric loss, and radiation loss. The efficiency of the antenna can be tuned for specified target bands. The efficiency of the dual-band antenna structure may be modified by adjusting dimensions of the structure, the gaps between the elements of the antenna structure, or any combination thereof. Similarly, structures can be modified in dimensions and gaps between elements to improve the efficiency in certain frequency bands as would be appreciated by one of ordinary skill in the art having the benefit of this disclosure.

Figure 6:
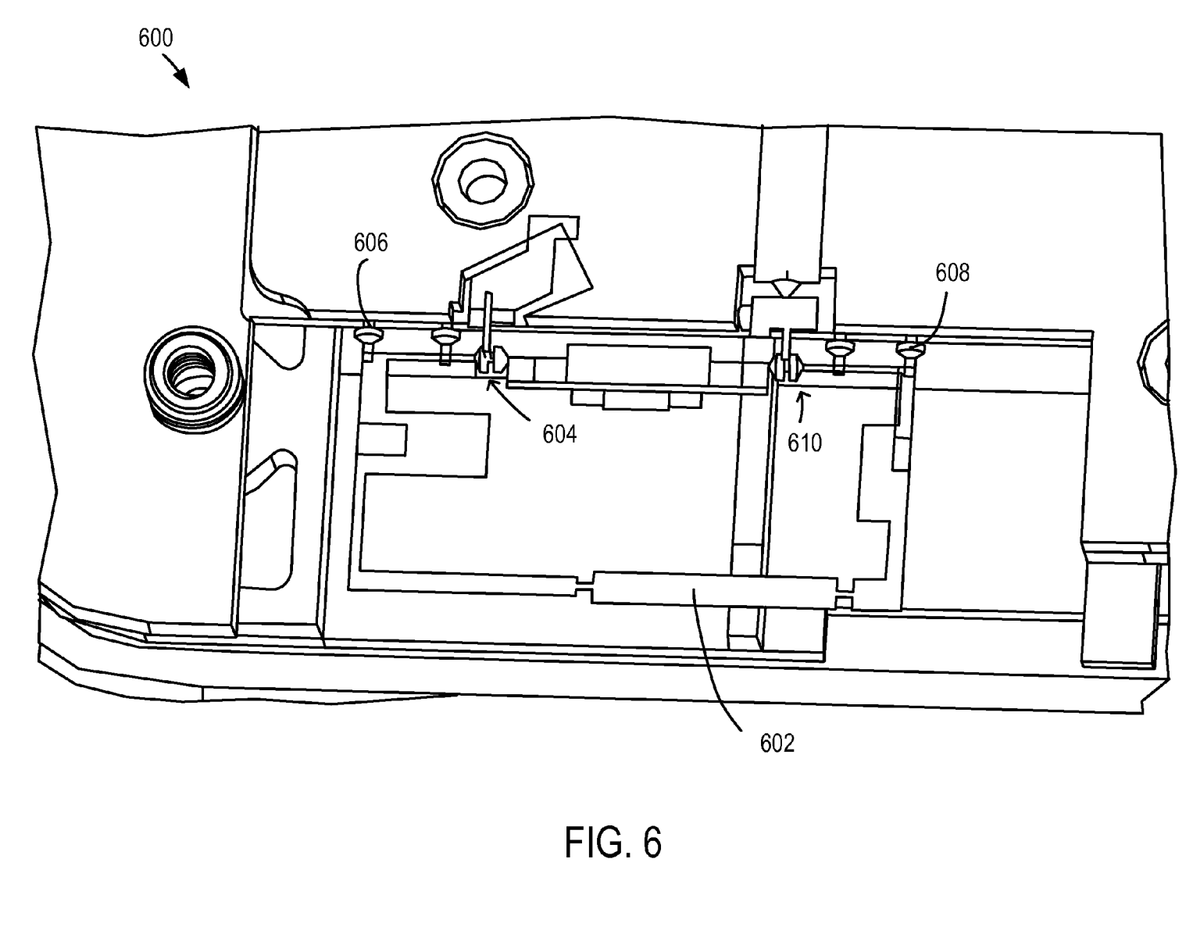
FIG. 6 illustrates additional current sinks used with a dual-band antenna structure in accordance with various embodiments.

FIG. 6 illustrates another example dual-band antenna structure 600 that can be utilized in accordance with various embodiments. In this example, the first circuit 610 and second circuit 604 are still present, but additional current sinks 606, 608 (or BPFs, various impedance matching components, etc.) are added in order to provide additional paths for the current to return to ground. If, for example, the 2.4G current passes through one of the band pass filters, the additional sinks can help direct at least a portion of that current back to ground. Each additional component 606, 608 can be an additional 5G BPF in at least some embodiments. Depending at least in part upon the configuration and size of the dual-band antenna structure, any appropriate number of additional sinks or BPFs can be used to redirect the current into the ground at a location that is relatively distant from the phantom block and/or user skin, etc.

Figure 7:
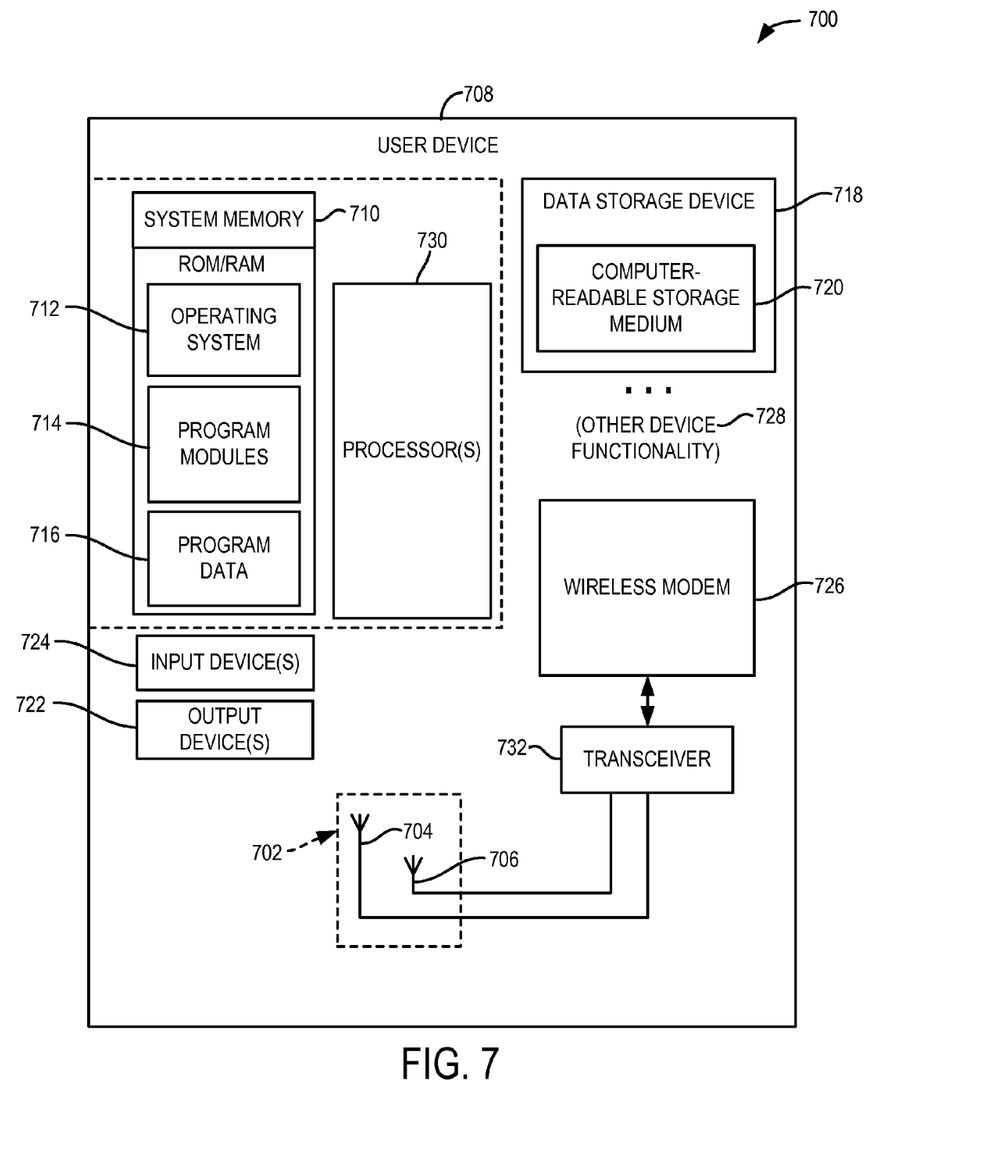
FIG. 7 illustrates example components of a client device in which various embodiments can be implemented.

FIG. 7 is a block diagram 700 of a user device 708 having the dual-band antenna structure 702 according to one embodiment. The user device 708 includes one or more processors 730, such as one or more CPUs, microcontrollers, field programmable gate arrays, or other types of processing devices. The user device 708 also includes system memory 710, which may correspond to any combination of volatile and/or non-volatile storage mechanisms. The system memory 710 stores information, which provides an operating system component 712, various program modules 714, program data 716, and/or other components. The user device 708 performs functions by using the processor(s) 730 to execute instructions provided by the system memory 710.

The user device 708 also includes a data storage device 718 that may be composed of one or more types of removable storage and/or one or more types of non-removable storage. The data storage device 718 includes a computer-readable storage medium 720 on which is stored one or more sets of instructions embodying any one or more of the functions of the user device 708, as described herein. As shown, instructions may reside, completely or at least partially, within the (non-transitory) computer-readable storage medium 720, system memory 710 and/or within the processor(s) 730 during execution thereof by the user device 708, the system memory 710 and the processor(s) 730 also constituting computer-readable media. The user device 708 may also include one or more input devices 724 (keyboard, mouse device, specialized selection keys, etc.) and one or more output devices 722 (displays, printers, audio output mechanisms, etc.).

The example user device 708 further includes a wireless modem 726 (or other such wireless communication component(s)) to allow the user device 708 to communicate via a wireless network (e.g., such as provided by a wireless communication system) with other computing devices, such as remote computers and computing systems. The wireless modem 726 allows the user device 708 to handle both voice and non-voice communications (such as communications for text messages, multimedia messages, media downloads, web browsing, etc.) with a wireless communication system. The wireless modem 726 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc. In other embodiments, the wireless modem 726 may communicate according to different communication types (e.g., WCDMA, GSM, LTE, CDMA, WiMax, etc.) in different cellular networks. The cellular network architecture may include multiple cells, where each cell includes a base station configured to communicate with user devices within the cell. These cells may communicate with the user device using the same frequency, different frequencies, same communication type (e.g., WCDMA, GSM, LTE, CDMA, WiMax, etc.), or different communication types. Each of the base stations may be connected to a private, a public network, or both, such as the Internet, a local area network (LAN), a public switched telephone network (PSTN), or the like, to allow the user devices to communicate with other devices, such as other user devices, server computing systems, telephone devices, or the like. In addition to wirelessly connecting to a wireless communication system, the user device 708 may also wirelessly connect with other user devices. For example, the user device 708 may form a wireless ad hoc (peer-to-peer) network with another user device.

The wireless modem 726 may generate signals and send these signals to a transceiver 732 for amplification, after which they are wirelessly transmitted via the dual-band antenna structure 702, including two loop elements: an outer loop element 704 and an inner loop element 706. Although FIG. 7 illustrates a transceiver(s) 732, in other embodiments a power amplifier or similar component may be used with the dual-band antenna structure 702 to transmit and receive an RF signal. Or, receivers (such as a GPS receiver) may be used instead of transceivers, etc. The dual-band antenna structure 702 may be any directional, omnidirectional, or non-directional antenna in a different frequency band. In addition to sending data, the dual-band antenna structure 702 also can receive data, which is sent to the wireless modem 726 and transferred to the processor(s) 730. The user device 708 may include one or more additional antennas (not illustrated) other than the dual-band antenna structure 702. When there are multiple antennas, the user device 708 may also transmit information using different wireless communication protocols. It should be noted that, in other embodiments, the user device 708 may include more or less components as illustrated in the block diagram of FIG. 7. In one embodiment, the dual-band antenna structure 702 is the dual-band antenna structure discussed with respect to FIG. 1, and the outer loop element 704 is the outer loop element 102 of FIG. 1 and the inner loop element 706 is the inner loop element 110 of FIG. 1. Alternatively, the dual-band antenna structure 702 may be other variants of the dual-band antenna structures as described herein.

In one embodiment, the user device 708 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hot spot and a connection to a wireless carrier system. In one embodiment, the first wireless connection is associated with a first resonant mode of the dual-band antenna structure 702 that operates at a first frequency band and the second wireless connection is associated with a second resonant mode of the dual-band antenna structure 702 that operates at a second frequency band. In another embodiment, the first wireless connection is associated with the first antenna element of the dual-band antenna structure and the second wireless connection is associated with a second antenna (not illustrated). In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a wireless modem 726 is shown to control transmission and reception via dual-band antenna structure 702, the user device 708 may alternatively include multiple wireless modems, each of which is configured to transmit/receive data via a different antenna and/or wireless transmission protocol.

The user device 708 delivers and/or receives items, upgrades, and/or other information via the network. For example, the user device 708 may download or receive items from an item providing system. The item providing system receives various requests, instructions and other data from the user device 708 via the network. The item providing system may include one or more machines (e.g., one or more server computer systems, routers, gateways, etc.) that have processing and storage capabilities to provide the above functionality. Communication between the item providing system and the user device 708 may be enabled via any communication infrastructure. One example of such an infrastructure includes a combination of a wide area network (WAN) and wireless infrastructure, which allows a user to use the user device 708 to purchase items and consume items without being tethered to the item providing system via hardwired links. The wireless infrastructure may be provided by one or multiple wireless communications systems. One of the wireless communication systems may be a wireless local area network (WLAN) hot spot connected with the network. The WLAN hot spots can be created by Wi-Fi® products based on IEEE 802.11x standards by Wi-Fi Alliance. Another of the wireless communications systems may be a wireless carrier system that can be implemented using various data processing equipment, communication towers, etc. Alternatively, or in addition, the wireless carrier system may rely on satellite technology to exchange information with the user device 708.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism (e.g., a public Wide Area Network (WAN) such as the Internet).

The user devices can be variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent to one of ordinary skill in the art having the benefit of this disclosure, however, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory or other non-transitory computer-readable medium. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An electronic device comprising:
    a transceiver to transmit and receive radio frequency (RF) signals;
    a RF feed coupled to the transceiver; and
    a dual-band antenna structure coupled to the RF feed, wherein the dual-band antenna structure comprises:
        a ground plane;
        an outer loop structure including an outer loop element, the outer loop element coupled to the RF feed at a feeding point at a near end of the outer loop element and coupled to the ground plane at a grounding point at a distal end of the outer loop element, the distal end of the outer loop element being farther from the RF feed than the near end of the outer loop element;

an inner loop structure including an inner loop element, the inner loop element coupled to the RF feed at the feeding point at a near end of the inner loop element and coupled to the ground plane at the grounding point at a distal end of the inner loop element, the distal end of the inner loop element being farther from the RF feed than the near end of the inner loop element;

a first low band band pass filter (BPF) disposed within the outer loop structure and a first high band BPF disposed between the outer loop element and the grounding plane, the first low band BPF and the first high band BPF forming a first circuit; and a second low band BPF disposed within the outer loop structure and a second high BPF disposed between the outer loop element and the grounding plane, the second low band BPF and second high BPF forming a second circuit, wherein the inner loop element is disposed at least partially within an inner area defined by the outer loop element, the inner loop element configured to radiate electromagnetic energy in a first quarter-wave resonant mode in a first band of the dual-band antenna structure when the RF signals are applied to the RF feed, wherein the outer loop element radiates electromagnetic energy in a second quarter-wave resonant mode in a second band of the dual-band antenna structure and radiates electromagnetic energy in a third three-quarters-wave resonant mode in the first band of the dual-band antenna structure when the RF signals are applied to the RF feed.

2. The electronic device of claim 1, wherein the outer loop element comprises:
   a first arm portion that extends from the feeding point to a first junction in a first direction;
   a second arm portion that extends from the first junction in a second direction towards a second junction;
   a third arm portion that extends from the second junction in a third direction towards a third junction;
   a fourth arm portion that extends from the third junction in a fourth direction towards a fourth junction; and
   a fifth arm portion that extends from the fourth junction in the first direction towards the grounding point, wherein the first arm portion, the third arm portion, and the fifth arm portion are parallel to the ground plane, and wherein the second arm portion and the fourth arm portion are perpendicular to the ground plane.

3. The electronic device of claim 1, wherein the first low band BPF, the first high band BPF, the second low band BPF, and the second high band BPF each comprise at least two impedance-matching components.

4. The electronic device of claim 1, wherein the first band comprises a higher frequency range than the second band, and wherein surface currents, generated due to the RF signals being applied to the RF feed, create a first hot spot of magnetic field, proximate the first circuit, and a second hot spot of magnetic field, proximate the second circuit, the first hot spot and second hot spot each corresponding to a respective area on the dual-band antenna structure at which surface-current density is higher than on an area surrounding the respective areas of the first hot spot and the second hot spot.

5. The electronic device of claim 4, wherein the outer loop element comprises:
   a first arm portion connected at the near end and extending in a first direction to a first junction; a second arm portion connected at the first junction and extending to a second junction in a second direction; a third arm portion connected at the second junction and extending in a third direction to a third junction; a fourth arm portion connected at the third junction and extending in a fourth direction to a fourth junction; and a fifth arm portion connected at the fourth junction and extending in the first direction to the distal end of the outer loop element, wherein the near end is disposed closer to the feeding point than to the first junction, the distal end is disposed closer to the grounding point than to the fourth junction, and the surface current of the RF signals creates the first hot spot near the feeding point and the second hot spot near the grounding point.

6. An apparatus comprising:
a radio frequency (RF) feed; and
a dual-band antenna structure coupled to the RF feed by a first circuit proximate a feeding point and coupled to a ground plane by a second circuit proximate a grounding point, wherein the dual-band antenna structure comprises a first loop antenna coupled to the feeding point and the grounding point and a second loop antenna coupled to the feeding point and the grounding point, the first loop antenna configured to radiate electromagnetic energy in a first resonant mode in a first frequency band and the second loop antenna configured to radiate electromagnetic energy in a second resonant mode in a second frequency band of the dual-band antenna structure, the first frequency band corresponding to a higher frequency band than the second frequency band, wherein the dual-band antenna structure is configured to create two hot spots, a first hot spot of the two hot spots being located proximate the first circuit, and a second hot spot of the two hot spots being located proximate the second circuit, and wherein the dual-band antenna structure further comprises:
   a first low band band-pass filter (BPF) disposed within an outer loop structure including the outer loop antenna,
   a first high band BPF disposed between the outer loop antenna and the grounding plane,
   a second low band BPF disposed within the outer loop structure, and
   a second high BPF disposed between the outer loop antenna and the grounding plane.

7. The apparatus of claim 6, wherein the second loop antenna comprises an outer loop element comprising a near end coupled to the feeding point, a distal end coupled to the grounding point, a first junction, and a second junction, wherein the first loop antenna is disposed at least partially within an inner area defined by the outer-loop element.

8. The apparatus of claim 7, wherein surface currents applied at the feeding point create the first hot spot and the second hot spot.

9. The apparatus of claim 6, wherein the second loop antenna comprises:
   a first arm portion that extends from the feeding point to a first junction in a first direction;
   a second arm portion that extends from the first junction in a second direction towards a second junction;
   a third arm portion that extends from the second junction in a third direction towards a third junction;

a fourth arm portion that extends from the third junction in a fourth direction towards a fourth junction; and a fifth arm portion that extends from the fourth junction in the first direction towards the grounding point, wherein the first arm portion, the third arm portion and the fifth arm portion are parallel to the ground plane, and wherein the second arm portion and the fourth arm portion are perpendicular to the ground plane.

10. The apparatus of claim 9, wherein the first loop antenna is disposed between the first arm portion and the fifth arm portion of the second loop antenna.

11. The apparatus of claim 6, wherein the first circuit is symmetric to the second circuit, each circuit of the first circuit and the second circuit being configured to constrain current over a determined range of frequencies from leaving a respective area proximate the circuit.

12. The apparatus of claim 6, wherein the first low band BPF, the first high band BPF, the second low band BPF, and the second high band BPF each comprise at least two impedance-matching components.

13. The apparatus of claim 6, wherein the first loop antenna and the second loop are quarter-wave antennas, and wherein the first frequency band is approximately 2.3 GHz to approximately 2.6 GHz and the second frequency band is approximately 5.0 GHz to approximately 6.0 GHz.

14. The apparatus of claim 6, wherein the first resonant mode is centered at approximately 5.1 GHz and the second resonant mode is centered at approximately 2.44 GHz.

15. The apparatus of claim 6, wherein the feeding point and the grounding point are at least 5 mm apart.

16. A method of operating an electronic device, the method comprising:

applying a current to a radio frequency (RF) feed coupled to a dual-band antenna structure to transmit RF signals in a first frequency range and a second frequency range, the dual-band antenna structure being coupled to the RF feed by a first circuit proximate a feeding point and coupled to a ground plane by a second circuit proximate a grounding point, wherein the current applied to the RF feed creates surface currents on the dual-band antenna structure, wherein the dual-band antenna structure comprises a first loop antenna and a second loop antenna;

creating, by the dual-band antenna structure, a first hot spot of magnetic field proximate the first circuit when the current is applied to the RF feed; and creating, by the dual-band antenna structure, a second hot spot of magnetic field proximate the second circuit when the current is applied to the RF feed, wherein:

the first circuit comprises:
a first low band band-pass filter (BPF) disposed within an outer loop structure including the outer loop antenna, and
a first high band BPF disposed between the outer loop antenna and the grounding plane, and the second circuit comprises:
a second low band BPF disposed within the outer loop structure, and
a second high band BPF disposed between the outer loop antenna and the grounding plane.

17. The method of claim 16, further comprising:
upon applying the current,
radiating, by the dual-band antenna structure, electromagnetic energy in a first resonant mode in a first frequency range;
radiating, by the dual-band antenna structure, electromagnetic energy in a second resonant mode in a second frequency range, and
radiating, by the dual-band antenna structure, electromagnetic energy in a third resonant mode in the second frequency range.

18. The method of claim 17, wherein the first frequency range is approximately 2.3 GHz to approximately 2.6 GHz and the second frequency range is approximately 5.0 GHz to approximately 6.0 GHz.

19. The method of claim 17, wherein the first resonant mode is centered at approximately 5.1 GHz, the second resonant mode is centered at approximately 2.44 GHz, and the third resonant mode is centered at approximately 5.6 GHz.

20. The method of claim 17, wherein the radiating the electromagnetic energy in the second resonant mode and in the third resonant mode comprises radiating, by the second loop antenna, electromagnetic energy in the second resonant mode and in the third resonant mode.

* * * * *